3,477,996
POLYESTERS PREPARED FROM TRIS - (2-HYDROXYALKYL) ISOCYANURATES AND ETHYLENICALLY UNSATURATED DICARBOXYLIC ACID ANHYDRIDES
Robert L. Formaini, Petersburg, Va., assignor to Allied Chemical Corporation, New York, N.Y., a corporation of New York
No Drawing. Filed Mar. 29, 1965, Ser. No. 443,655
Int. Cl. C08g 17/04, 17/10
U.S. Cl. 260—75                    4 Claims

ABSTRACT OF THE DISCLOSURE

A polyester which results as the reaction product of a tris-(2-hydroxyalkyl) isocyanurate wherein each 2-hydroxyalkyl group contains between 2 and 4 carbon atoms and a di- or tricarboxylic acid.

---

This invention relates to novel polyester compositions and process for making the same. More particularly, the polyesters of the invention are polycondensation products of ester-forming starting materials, one of which is a tris-(2-hydroxyalkyl)isocyanurate.

The polyesters of the invention exhibit numerous superior properties compared to conventional polyesters. These properties include high temperature stability which makes them suitable for laminating metal, asbestos sheets and the like, and for impregnating glass cloth; the polyesters also have improved electrical and dielectric properties and increased strength. The polyesters of the invention have excellent adhesion to metal and other substrates, have a high degree of flexibility and toughness when used as coating compositions.

The invention comprises a polyester prepared from a tris - (2 - hydroxyalkyl)isocyanurate wherein each (2-hydroxyalkyl) group contains between 2 and 4 carbon atoms, and from an organic polybasic acid, preferably a dicarboxylic acid having at least one ethylenically unsaturated bond, and between 2 and 20, preferably 4–10 carbon atoms. Tris - (2 - hydroxyalkyl)isocyanurates and their preferred method of preparation are described in United States Letters Patent No. 3,088,948 to Allied Chemical Corporation.

In accordance with the invention a polyester can be prepared from a tris-(2-hydroxyalkyl)isocyanurate as the only polyol component, or as part of a polyol component conventionally used in the preparation of polyesters; the latter usually comprising a glycol, by reacting the same with a polybasic acid. Polybasic acids having ethylenically unsaturated bonds are preferred because the resulting polyester can be crosslinked at the unsaturated sites as well known in the art.

The preparation of the polyesters in accordance of the invention can be accomplished in a known manner, for example, by polycondensation of the components at elevated temperatures such as 120–260° C.

A large number of organic acids and anhydrides can be used in preparing the polyesters of the invention. These acids include benzene dicarboxylic acids, such as isophthalic and terephthalic acids, trimellitic anhydride, fumaric, succinic, adipic, sebacic, azelaic, maleic, phthalic, tetrahydrophthalic, itaconic acids and/or anhydrides; endo-cis-5-norbornene-2,3-dicarboxylic anhydride sold by Allied Chemical Corporation under the trade name NADIC Anhydride, and methylbicyclo (2.2.1) heptene-2,3-dicarboxylic acid isomers sold by Allied Chemical Corporation under the trade name of NADIC Methyl Anhydride.

The polyester of the invention can be made as previously stated, from the combination of conventional polyol or polyols and a tris-(2-hydroxyalkyl)isocyanurate. Furthermore, the polyesters can be made from a mixture of two or more of the acidic compounds described above. The resins can be clear or pigmented, as desired; and can be dissolved in a known crosslinking agent such as styrene, or butylated melamine.

The following examples describe the best method contemplated for carrying out the present invention. It is to be understood that the invention is not to be limited to all details of the examples.

EXAMPLE 1

1.4 mols tris-(2-hydroxyethyl)isocyanurate (THEIC), 1 mol phthalic anhydride, 1 mol maleic anhydride, and 0.1 part by weight hydroquinone as stabilizer against effects of elevated temperatures were placed into a resin kettle equipped with stirrer, thermometer, gas-inlet tube and condensers. Dry nitrogen gas was then introduced and the mixture was heated with constant agitation to 80° C. At this temperature the mixture fused and a mobile slurry was obtained. The temperature was then raised to 177° C. over a period of 85 minutes, at which point first amounts of water of esterification distilled off. Temperature was maintained at 176–177° C. for an additional 65 minutes during which distillate was recovered at a uniform rate and gradual change to a clear resin was observed. Additional water of condensation was removed from the reaction mixture by raising the reaction temperature to 208° C. and then applying mild suction. The liquid polyester was cooled to room temperature yielding a solid polymer which was easily ground to a free flowing powder.

The polyester had a softening point of about 115° C. and was soluble in organic solvents. Steel panels were coated with the polyester diluted with 50% by volume methyl-Cellosolve acetate (2-methoxyethylacetate). The solvent was evaporated at 125° C. and the coating cured at 240° C. for one hour. The coating was flexible and showed perfect adhesion to the steel panels when subjected to a bend test. The film did not crack when subjected to both front and back impact tests.

In a mixture of 7 parts by weight polyester and 3 parts by weight styrene, catalyzed with 1% by weight benzoyl peroxide, at 100° C. a gel time of approximately 1 minute was observed. The polyester is compatible with styrene, and the mixture can be used in coatings and glass fiber laminates.

EXAMPLE 2

1.42 mols propylene glycol, and 0.15 mol THEIC were heated with stirring to 100° C. under a blanket of dry nitrogen in the apparatus of Example 1. Subsequently 1.67 mols adipic acid was added and the temperature was raised to 142° C. at which temperature first amounts of water of condensation started to collect. Reaction temperature was then gradually raised to 260° C. over a period of 5 hours during which water was taken overhead and samples of reaction mixture were withdrawn for standard acid number determinations. After five hours, 52.8 parts by volume distillate had been collected and the acid number of the resin was 47. The clear resin was cooled to room temperature yielding a viscous liquid which set to a solid on prolonged standing. Copper wire was coated with six layers of the polyester diluted with 50% by volume cresylic acid. Each coat was cured at 240° C. for 4 minutes. The final insulated wire had a continuous coat of resin.

EXAMPLE 3

7.1 mols propylene glycol, 0.75 mol THEIC, and dry nitrogen were introduced into the resin kettle of Example 1. The mixture was heated to about 126° C. at which temperature 3.75 mols maleic anhydride, and 3.75 mols phthalic anhydride were added. The reaction temperature was then gradually raised to 220° C. over a period of 5 hours during which time water distilled off and samples of the reaction mixture were taken for standard acid number determinations to follow the progress of the polycondensation reaction. After five hours, 113 parts by volume distillate had been collected and the acid number of the liquid polyester was 34.2. The liquid polyester was then cooled to 114° C., and 578 parts by weight styrene was added to 1345 parts by weight of the polyester. The resulting solution was filtered and cooled to room temperature. The viscosity of the resin product was 7500 cps. Laminates prepared from the resin showed superior thermal physical and electrical properties when compared to similar resins without THEIC.

EXAMPLE 4

Maleate polyester resins were prepared both with and without THEIC. The polyethylene glycol used in the resins had an average molecular weight of 600 and both resins were pourable at room temperature. The composition and preparation parameters of the THEIC-containing resin and the THEIC-free resin (Control A) are given in the following table:

|  | Ex. 4 | Control A |
| --- | --- | --- |
| Polyethylene glycol, mols | 1.65 | 3.3 |
| THEIC, mols | 1.0 | |
| Maleic anhydride, mols | 3.0 | 3.0 |
| (OH)/(COOH) ratio | 1.05 | 1.1 |
| Reaction temperature,° C | 160-170 | 160-170 |
| Reaction time, hrs | 32 | 55 |
| Acid no | 29.4 | 19.3 |

1% by weight benzoyl peroxide and 0.001% by weight hydroquinone was added to the resins, and castings were made using the following curing cycle:

Temperature, ° C.: Hrs.
 55 _____ 18
 75 _____ 4
 100 _____ 18
 130 _____ 4

Mechanical and dielectric properties of the casting were determined using ASTM procedures. The results are summarized in the following table:

| Property | | Ex. 4 | Control A |
| --- | --- | --- | --- |
| ASTM No.: | | | |
| D-150 | A.C. dissipation factor at— | | |
| | 1,000 cps | 0.035 | 0.057 |
| | $10^5$ cps | 0.045 | 0.042 |
| D-149 | Dielectric strength, volts per mil | (1) | (2) |
| D-638 | Tensile strength, p.s.i | 1,625 | 79.8 |
| D-638 | Tensile strength, p.s.i. (glass-mat filled) | 8,472 | 4,052 |
| D-1037 | Modulus of rupture, p.s.i | 11,100 | 1,745 |

[1] 318 at 73.5 mils, flash-over.
[2] 200 at 75 mils, punctured.

Contrasted to Control A, the resin of Example 4 withstands moderately high temperatures and is useful for laminating asbestos sheets as well as for impregnating glass cloth.

EXAMPLE 5

3 mols maleic anhydride, 1.65 mols polyethylene glycol having an average molecular weight of 200 and 1 mol THEIC were added to the reaction kettle of Example 1. The mixture was agitated under nitrogen. The mass was then heated in an oil bath to 160° C. and maintained between 160° C. and 170° C. for a period of about six hours. The temperature was then raised to 190° C. and the reaction continued until an acid number of about 48 was achieved. Total reaction time at 160–190° C. was approximately 12 hours. The resin was cooled to room temperature yielding a viscous liquid with a bubble-viscosity of $Z_1$–$Z_2$ on the Gardner scale.

A casting resin was prepared from a part of the resin of the Example by blending it with an equal weight of diallylphthalate crosslinking agent which contained 1% benzoyl peroxide crosslinking catalyst, and 0.001% by weight hydroquinone stabilizer. Sheets were cast in ⅛" x 12" x 12" cellophane-lined molds by curing in an oven using the following heat cycle:

Temperature, ° C.: Hrs.
 55 _____ 18
 75 _____ 4
 100 _____ 18
 130 _____ 4

Crack resistance to cure was determined by casting 20 gram quantities of the polyester-diallylphthalate mixture in a 2¼" O.D. x ⅝" deep soft aluminum cup which contained a standard ½" I.D. hexagonal-head machine nut in the center of the cup. The nut was completely submerged in this quantity of polyester. The castings were cured at 55° C. for 4 hours and then 150° C. for 4 hours. No cracks were on the surface, and only slight cracking inside the nut were observed. Test specimens were cut from the rigid sheets and tensile strength and burn rates was determined in accordance with ASTM–D–638 (Type I) and ASTM–D–635, respectively. The tensile strength was 4540 p.s.i. and the burn rate was 0.79 in./min.

Glass mat-reinforced multiple laminates were prepared which consisted of 50% by weight of a standard chopped-strand mat (1¼ oz.) and 50% by weight of the benzoyl peroxide-catalyzed polyester-diallylphthalate mixture. The laminates were cured under 0.15 p.s.i. load using the same cure cycle as for the fiber-free cast sheets described above in this example. The modulus of rupture in accordance with ASTM–1037 was 21,420 p.s.i., and the tensile strength determined in accordance with ASTM–D–638 was 12,420 p.s.i.

EXAMPLES 6–13

The resin compositions of Examples 6–13 were prepared by using the apparatus of Example 1. In Examples 6–11 8.22 mols propylene glycol were heated to 80° C. with stirring under a blanket of dry nitrogen, at which temperature 0.276 mol THEIC and other below-listed reactants were added to the reaction apparatus. In Examples 12 and 13, 1.64 mols THEIC was used, and in Example 12 5.76 mols diethylene glycol was used in place of propylene glycol. In Examples 12 and 13 all components were added initially to the reaction vessel and heated under a blanket of dry nitrogen; in the case of Example 12 to 160° C. and in the case of Example 13 to 230° C. With the exception of Example 12 where the reaction was conducted at 160° C., in all examples the components were heated to 230° C. for a period of about 3 hours resulting in an acid number of approximately 40. Water of condensation was continuously withdrawn during the reaction.

During cooling, 0.18 parts by weight hydroquinone stabilizer was added to each resin. 70 grams of each resin was mixed with 30 grams of triallyl isocyanurate and 2 grams methyl ethyl ketone peroxide, and the mixture was coated onto steel panels and cured in steps at 60° C., 90° C. and 130° C. The panels showed superior flexibility, adhesion, impact resistance and thermal properties compared to similar coating compositions without THEIC. The catalyzed material of the examples was found to be useful also as a potting resin, and in reinforced laminating applications.

The concentration figures in the following table are mols, and the reactants are in addition to those already stated above:

Ex. 6—4.0 isophthalic acid, 4.0 maleic anhydride.
Ex. 7—4.0 terephthalic acid, 4.0 maleic anhydride.
Ex. 8—2.66 trimellitic anhydride, 4.0 maleic anhydride.
Ex. 9—4.0 succinic anhydride, 4.0 maleic anhydride.
Ex. 10—4.0 tetrahydrophthalic anhydride, 4.0 maleic anhydride.
Ex. 11—4.0 itaconic anhydride, 4.0 maleic anhydride.
Ex. 12—7.47 NADIC Methyl Anhydride.
Ex. 13—7.47 tetrahydrophthalic anhydride.

I claim:
1. A polyester which comprises the reaction product of a tris-(2-hydroxyalkyl) isocyanurate wherein each 2-hydroxyalkyl group contains between 2 and 4 carbon atoms, and a dicarboxylic acid anhydride consisting of at least one ethylenically unsaturated anhydride of the group consisting of maleic anhydride, tetrahydrophthalic anhydride, itaconic anhydride, and methylbicyclo (2.2.1) heptene-2,3-dicarboxylic acid anhydride, said polyester being useful in a coating composition.

2. A polyester as defined in claim 1, wherein said isocyanurate is tris-(2-hydroxyethyl) isocyanurate.

3. The polyester of claim 2, comprising 0.15–1.5 mols tris-(2-hydroxyethyl) isocyanurate and between 0.5 and 4 mols of said dicarboxylic anhydride.

4. The polyester of claim 3 comprising in addition between 0.5 and 8.5 mols of a diol having 2–12 carbon atoms.

References Cited
UNITED STATES PATENTS

| | | | |
|---|---|---|---|
| 3,390,131 | 6/1968 | Roeser | 260—75 |
| 3,342,780 | 9/1967 | Meyer et al. | |

WILLIAM H. SHORT, Primary Examiner

L. L. LEE, Assistant Examiner

U.S. Cl. X.R.

117—132, 161; 161—214